United States Patent [19]
Day et al.

[11] Patent Number: 5,941,951
[45] Date of Patent: Aug. 24, 1999

[54] METHODS FOR REAL-TIME DETERMINISTIC DELIVERY OF MULTIMEDIA DATA IN A CLIENT/SERVER SYSTEM

[75] Inventors: Michael Norman Day, Round Rock, Tex.; Lance Warren Russell, Hollister, Calif.; Donald Edwin Wood; Leo Yue Tak Yeung, both of Austin, Tex.

[73] Assignee: International Business Machines Corporation, Armonk, N.Y.

[21] Appl. No.: 08/961,468

[22] Filed: Oct. 31, 1997

[51] Int. Cl.[6] .................................................. G06F 13/00
[52] U.S. Cl. ............................................................ 709/233
[58] Field of Search ........................ 364/DIG. 1 MS File, 364/DIG. 2 MS File; 370/408; 709/201, 203, 217, 219, 231, 232, 233, 234, 238; 379/88.13, 909; 707/908

[56] References Cited

U.S. PATENT DOCUMENTS

| | | | |
|---|---|---|---|
| 5,262,875 | 11/1993 | Mincer et al. | 358/335 |
| 5,408,448 | 4/1995 | Carman | 369/32 |
| 5,414,455 | 5/1995 | Hooper et al. | 348/7 |
| 5,583,561 | 12/1996 | Baker et al. | 348/7 |
| 5,583,868 | 12/1996 | Rashid et al. | 370/394 |
| 5,602,582 | 2/1997 | Wanderscheid et al. | 348/12 |
| 5,602,992 | 2/1997 | Danneels | 395/200.19 |
| 5,623,699 | 4/1997 | Blakeslee | 395/872 |
| 5,742,610 | 4/1998 | Natarajan | 370/472 |
| 5,838,683 | 11/1998 | Corley et al. | 370/408 |

*Primary Examiner*—Robert B. Harrell
*Attorney, Agent, or Firm*—Richard A. Henkler; Jack V. Musgrove; Andrew J. Dillon

[57] ABSTRACT

A method of delivering data in an on-time manner across a communicating environment, such as multimedia data in a network or broadcast environment. The data is transmitted from a data pump at a revised transmission time which is a function of a base transmission time and a delay value. The delay value is calibrated by monitoring one or more processes between the data pump and an associated controller which receives requests from clients. The controller may include an application server which handles the requests, and a control server which processes commands from the application server and provides corresponding control functions to the data pump.

16 Claims, 4 Drawing Sheets

Broadcast Automation Environment

METHODS FOR REAL-TIME DETERMINISTIC DELIVERY OF MULTIMEDIA DATA IN A CLIENT/SERVER SYSTEM

BACKGROUND OF THE INVENTION

1. Field of the Invention

The present invention generally relates to computer and communications systems, and more particularly to a method for storing and delivering data in an on-time manner across a communications environment using a computer system, and still more particularly to the efficient storage and synchronized delivery of multimedia content over a network or broadcast environment.

2. Description of the Related Art

Information technology has progressed immensely in the past several decades, but changing demands continue to place new burdens on information systems. In particular, the storage and distribution of data has become increasingly difficult as ever larger amounts of information are required to be provided across communications environments. For example, broadcast media (television, radio, etc.) must constantly stockpile old information, while gathering new details for programming on current events. Another example relates to computer applications which are capable of using (and often demand access to) very large files, such as multimedia files containing video, audio, text and graphics content.

One approach to reducing data storage and distribution volume relies on shared resources, such as those provided by a "client-server" computer network. A typical client-server network has several computer servers which are interconnected, either directly to each other or indirectly through one of the other servers, and which provide information to individual users and applications at client workstations. The information provided to users can be in the form of programs which run locally on a given workstation, or in the form of data such as files used by other programs. Users can also communicate with each other in real-time over the network, as well as by delayed file delivery. The network can be local in nature, or can be further connected to other systems. This construction is generally applicable to very large networks such as the Internet, as well as small networks such as a local area network (LAN).

As the price and performance of client-server networks has improved, this technology has been applied more to digital multimedia data sharing. Digital multimedia files carrying video content, audio content, or both, can be transmitted in a number of standard formats, such as audio video interleave (AVI), movie (MOV), and moving picture experts group (MPEG). Digital data can be converted to an analog format such as National Television Standards Committee (NTSC) or Phase Alternation Line (PAL). As noted above, these digital multimedia files are relatively large, such as one megabyte of data for a short video clip, and several gigabytes for a lengthy film or other presentation. Because encoding of digital multimedia data (especially video data) requires a large amount of storage and a real-time constant rate of data delivery (to avoid jittering or breaking up of smooth motion video), it presents unique problems for multimedia client-server computing. Conventional multimedia servers lack the capability for integrated real-time content loading (input) and data streaming (output). These services are usually made available as separate and non-overlapping steps or operations, which tend to be inefficient and time consuming. Further, these solutions do not scale well when a large number of content loading and data streaming operations are required.

Another limitation of prior art multimedia servers relates to application programming interfaces (APIs), which are set by the server and used by the client to access services provided by the server. The functional deficiencies of server access interfaces make it difficult to develop an integrated application that can take advantage of concurrency and real-time, shared access to multimedia data that is available in the server. A lack of real-time access for real-time stored data can result in loss of business opportunity.

Even if a real-time constant rate of data delivery were achieved to ensure a high quality presentation of the multimedia content, there is no guarantee that the presentation would be smooth, since delays arising from the data distribution topology can adversely affect the presentation, and prevent synchronization between multiple (concurrent or successive) multimedia components. These delays are not generally predictable and vary from environment to environment. This problem can arise, for example, when an audio-only file (e.g., background music or narration) is to be played with a separate but associated video-only file, or when a series of multimedia files are intended to be viewed without any break between the files, i.e., no pause between the termination of one file and the beginning of the next. This unpredictable delay causes difficulty in scheduling and synchronizing multimedia data delivery from multiple delivery sources. It is especially undesirable with video.

In light of the foregoing, it would be desirable to devise a method and system for accessing large volumes of data in a more efficient and reliable manner, and to enable the user (such as a program scheduling application) to schedule a multimedia data presentation received from different sources. It would be further advantageous if the method and system could be used to provide multimedia server programming services which were flexible enough to allow simultaneous multimedia inputs and outputs, while sharing server and network resources in real-time to optimize server resource utilization without sacrificing quality of services to a client.

SUMMARY OF THE INVENTION

It is therefore one object of the present invention to provide an improved method of storing and distributing large amounts of information.

It is another object of the present invention to provide such a method that is adapted to distribute multimedia data over a network or broadcast environment in a real-time manner.

It is yet another object of the present invention to provide such a method that allows multiple data components to be properly synchronized.

The foregoing objects are achieved in a method of delivering data in an on-time manner across a communications environment, generally comprising the steps of calibrating a data pump with a controller to determine a maximum transmission delay value across the entire system, scheduling a base transmission time for delivery of an asset in response to a request received at the controller, calculating a revised transmission time using the base transmission time and the transmission delay value, and initiates transmitting the asset from the data pump to the multimedia rendering device at the revised transmission time. The communications environment can be a network environment using digital transmissions, or a broadcast environment using analog transmissions. In one embodiment, the controller has an application server for receiving the request, and a control server for processing commands from the application server and providing corresponding control functions to the data pump; calibration measures the transmission delay value from the time a command is issued by the application server in response to the request. The request can be formulated using a content management database.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to an improved method of transmitting information across a communications environment, and more particularly to a method of delivering multimedia data along one or more input/output ports of a data server, in response to real-time or preprogrammed requests from a client. In a preferred embodiment, the invention uses a controller which provides capabilities for integrated multimedia content loading and data streaming which is network transparent and can be scaled to support a large number of clients. Clients are guaranteed quality of services for multimedia data access through server bandwidth resource management and load balancing based on requests from the network-connected client applications.

The invention may be implemented in IBM's VideoCharger server and MediaStreamer product, although the present invention is not limited to those specific systems. The VideoCharger server is designed for IBM's AIX operating system running on an IBM RS/6000 computer. This multimedia server product combines key functions of digital computing and the video broadcast industry into a versatile, cost-effective system for high-quality storage and delivery of multimedia content using MPEG files. MPEG decoders on optional analog output ports can produce NTSC or PAL output to work together with local analog multimedia equipment. Further details of the VideoCharger server and MediaStreamer product are disclosed in U.S. patent application Ser. No. 08/961,704, entitled "Scalable Network Transparent Access Framework for Multimedia Serving," filed on or about Oct. 31, 1997, and U.S. patent application Ser. No. 08/961,706, entitled "Seamless Playlist," filed on or about Oct. 31, 1997, each of which is hereby incorporated.

Figure 1:
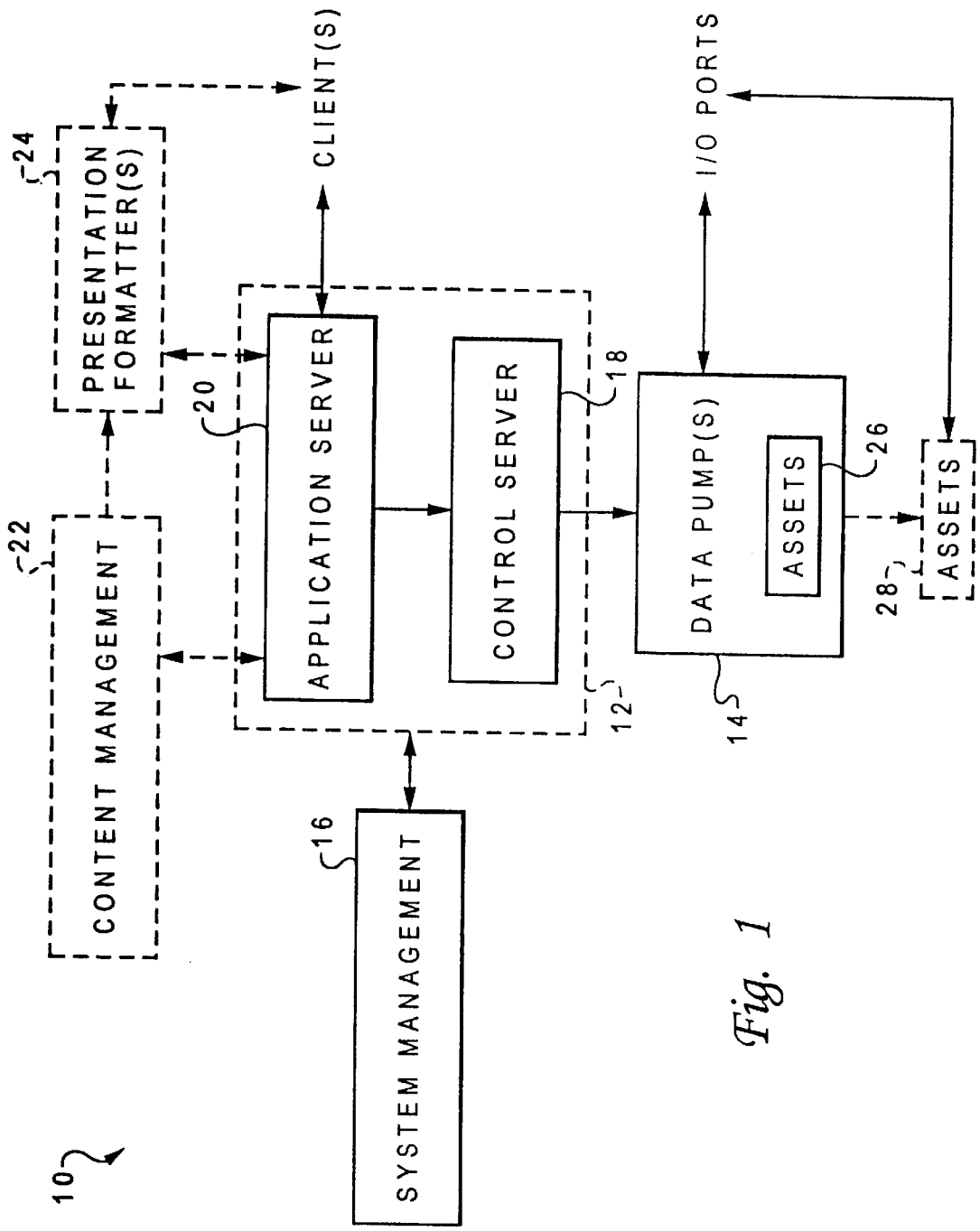
FIG. 1 is a block diagram of one embodiment of an access framework constructed in accordance with the present invention for storage and on-time delivery of data, particularly multimedia content.

With further reference to FIG. 1, an exemplary multimedia server 10 constructed in accordance with the present invention includes a controller 12 connected to at least one data pump 14, and having a system management software component 16. In the depicted embodiment, controller 12 includes a control server 18 and an application server 20. Control server 18 is the main control point for coordinating the setup and delivery of an asset (e.g., a multimedia file), including selection of data pumps and command processing, and provides control functions including "VCR" (video cassette recorder) commands such as play, stop, pause, resume, rewind, forward, and record. Control server 18 also provides resource management, including admission control and load balancing, for both playing streams and content loading, and stores a catalog of assets that are available on the data pump(s).

Application server 20 handles communication with a client requesting an asset, e.g., it receives requests from the client and can issue VCR-like commands to control individual streams. Application server 20 can include an optional content management database 22 containing additional information about available assets (e.g., director, subject, actors, etc.), and provide tools for adding, deleting and viewing such asset information, and for changing asset attributes such as encoding type and play rate. A presentation formatter 24 may be used in conjunction with content management to simplify user access to assets by formulating the response.

Data pump 14 controls input/output (I/O) ports for play and record streams. In play mode, data pump 14 plays a file or a list of files to a client across a digital network or through analog output ports. In record mode it receives data, and stores it into a file. In the illustrative embodiment, the data pump record mode handles only constant bit rate MPEG streams, although it could easily be adapted to record other formats or to convert other formats to an MPEG format. Data pump 14 has internal assets 26, preferably stored in a disk-based multimedia file system (discussed further below) which ensures that requested access to assets does not exceed the capabilities of the disk subsystem. External assets 28 may also be accessed, e.g., via real-time loading to server 10 from remote systems including another multimedia server similar to server 10, a remote file, or an application such as an analog-to-digital video encoding application. The depicted embodiment is easily scaled to larger sizes by simply adding more data pumps to the system (each can be equipped with its own set of disks and network adapters, and can serve, for example, between 10–300 Mb/s of aggregate stream (10 to 1950 streams) and add over one terabyte of data storage (700 hours of 1.5 Mbps video content) depending upon the configuration).

System management component 16 provides tools for changing communications and storage configurations, for backing up configurations, for starting and stopping controller 12 or its individual components, and for monitoring system 10.

Those skilled in the art will appreciate that the foregoing components may physically reside on a single computer system, or that server 10 may actually be spread out among many machines, such as by providing a first dedicated server computer for controller 12 and a second dedicated server computer for data pump 14. Application server 20 can similarly be integrated with control server 18 in a single computer, or these servers may be provided in different computers. Network support can be provided for any medium or protocol, e.g., ATM, FDDI, concentrators, ethernet, token ring, etc.

Figure 2:
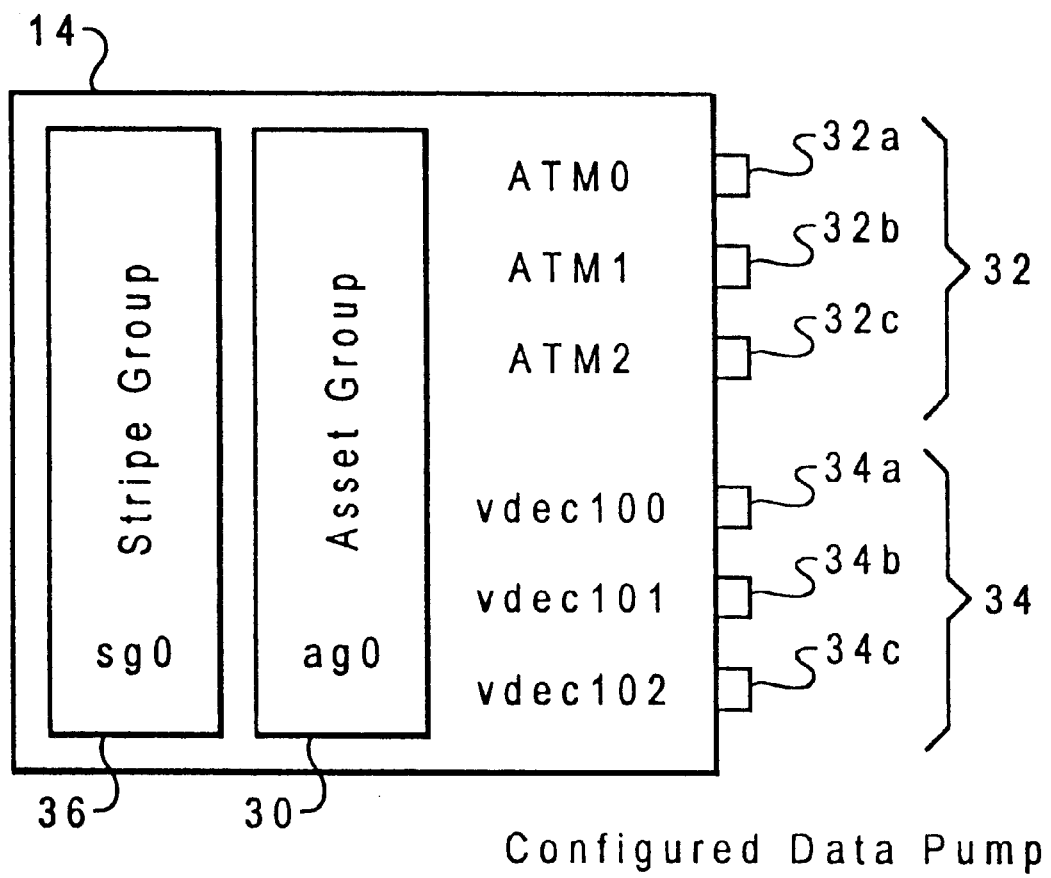
FIG. 2 is a block diagram of one embodiment of a data pump constructed in accordance with the present invention, and usable with the access framework of FIG. 1, configured to have content loaded thereon.

Referring now to FIG. 2, data pump 14 may be configured to optimize data storage and access. Assets may be grouped according to use, e.g., by departments within a business. Content management can be used to determine what assets are available (stored) in specified asset groups. A default asset group 30 can be provided. Ports can also be grouped. For example, if multiple ATM ports are connected to the same ATM networks, these ports can be configured under the same port group. FIG. 2 shows a first set of ports 32a–32c configured as a first port group 32, and a second set of ports 34a–34c configured as a second port group 34.

A preferred multimedia file system for use with the present invention (e.g., to store internal assets 26) uses a "striping" method to spread the content of a multimedia file across all of the disks in a file system. With stripe groups, disks are grouped together to serve media streams, making it much easier to serve very large files (e.g., larger than 2 gigabytes). A stripe group can identify the type of file system used (such as an SSA RAID system). A default stripe group 36 can be provided. A complementary product which economically stores large amounts of multimedia assets is IBM's MediaStreamer archive which supports a subset of the content management capabilities of the present invention MS (the MediaStreamer archive is available as a feature of IBM's 3466 Network Storage Manager system).

Figure 3:
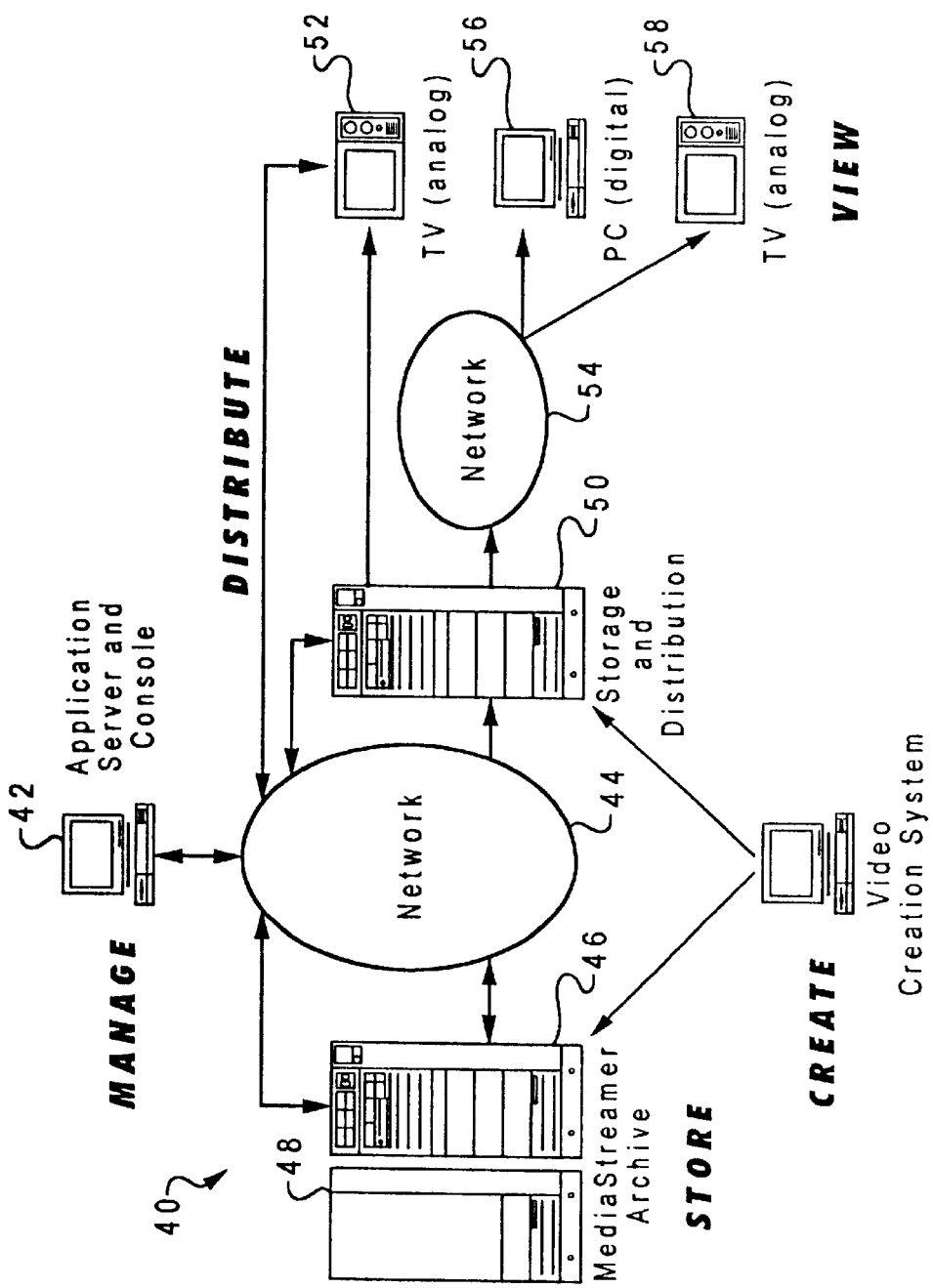
FIG. 3 is a pictorial representation of a network implementation of the present invention.
Figure 4:
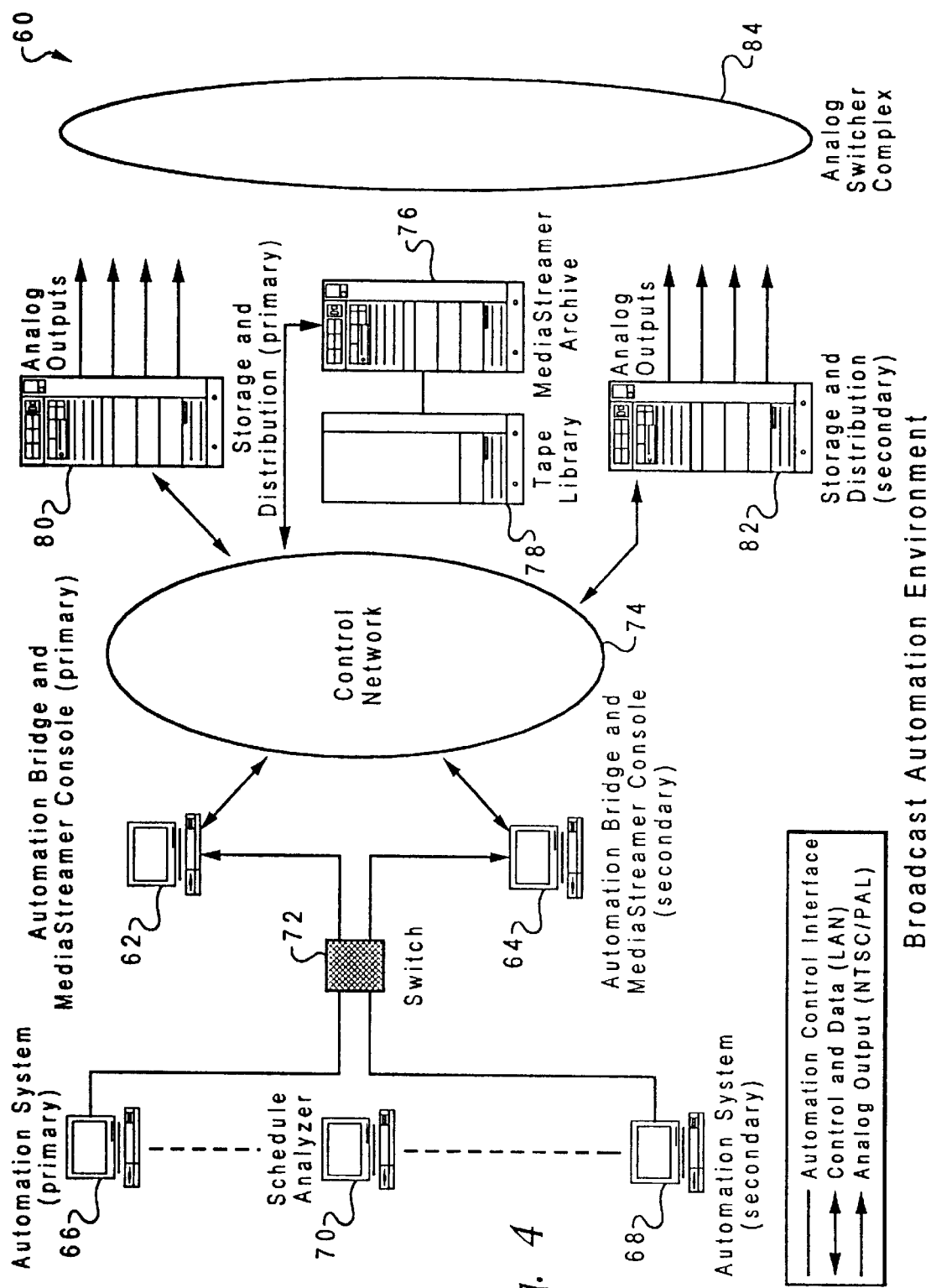
FIG. 4 is a pictorial representation of a broadcast implementation of the present invention.

With further reference to FIGS. 3 and 4, the present invention may be implemented in various environments, and particularly in network and broadcast automation environments. FIG. 3 is a pictorial representation of a network implementation 40. The controller (application server and control server) reside on a first computer 42 which includes a console for system and content management. Server 42 is connected over a first (local) network 44 to a multimedia archive 46 which may include a tape library 48. Assets stored on the archive or at remote storage locations can be staged at (temporarily copied to) a storage and distribution node 50. The data stream can then be transmitted from storage and distribution node 50 either in an analog format (e.g., directly to a television 52), or in a digital format (e.g., across a second (global) network 54 for reproduction at a computer workstation 56 or conversion to an analog format for transmission to another television 58). An asset can be loaded with either a file protocol, such as FTP (file transfer protocol), or a stream protocol, such as native ATM AAL5 (an industry standard for MPEG streaming). Network implementation 40 may include other components (not shown) such as encoders, master automation systems, analog switches, traffic systems, etc.

Network implementation 40 of the present invention can be used to deliver real-time (streamed) video/audio to any network-connected clients, including those on the Internet or an intranet, using standard LAN technology with TCP/IP and FTP. An Internet "web browser" can be used to select a video for viewing (such as a short clip or commercials, or a full-length film). A variety of encoding formats can be supported for delivery of video streams, including RTP, TCP, HTTP and IP multicast. A presentation formatter server can provide presentation format pages to initiate a common gateway interface (CGI) program used to facilitate client requests. The presentation formats might include specific video selection (where the name or other access parameter of a desired file is already known), video-on-demand (allowing a client to select an asset from a dynamically generated list), and joining multicast sessions (previously scheduled video broadcasts to a group of clients, such as students enrolled in a distance-learning class).

FIG. 4 is a pictorial representation of an alternative implementation 60 of the present invention adapted for broadcast automation. The controller resides on a primary automation bridge and console 62; a redundant (secondary) automation bridge and console 64 can be used for critical applications. The controller can be managed by an automation system which includes a primary automation system console 66, a secondary automation system console 68, and a schedule analyzer 70. These latter three components may be existing equipment used in the prior art to control, e.g., a bank of video tape recorders, so a software bridge program can be written to translate the commands and interface from the existing equipment into application programming interface (API) calls which are transmitted across a switch 72. The API provided by the controller (and made available as linkable libraries to the clients) can be used for session management, stream connection management, stream operations, and content management. The API preferably employs Distributed Computing Environment (DCE) Remote Procedure Calls (RPC) as the underlying communication mechanism to pass requests and responses between applications and the control server.

Server 62 is connected over a control network 74 to a multimedia archive 76 which may include a tape library 78. Assets stored on the archive or at remote storage locations can be staged at a primary storage and distribution node 80 and a secondary storage and distribution node 82. The data stream can then be transmitted from storage and distribution nodes 80 or 82 across an analog switcher complex 84.

There is a time delay from the moment a request is received at the application server (e.g., to play an asset) until the file or stream is actually transmitted from an associated data pump (for example, TCP/IP does not guarantee time delivery). This time period may be synchronized between the application server and the data pump in accordance with the present invention. The time period can be determined via calibration of a maximum transmission or processing delay incurred between various processes of the system when processing a user play request. This can be done by measuring the maximum delay and statistical deviation for the time delay from the first process (e.g. application server) receiving the play request to the last process (data pump) delivering the multimedia data to the multimedia rendering device (e.g. PC). A large sample of request/transmission measurements are used preferably to determine the maximum delay period to gain a level of tolerance (e.g., 99%) for the particular operating environment (this pre-determined delay period can be recalculated periodically by keeping statistical information in real time to reflect the current operating environment). Alternatively, the maximum delay and deviation can be returned to the requesting user application (such as a program scheduler). The requesting user application can use this information to synchronize the scheduled play from multiple data sources (from separate multimedia data segments in one or more data pumps) by adding the delay plus the delta delay due to the deviation to account for the delay variance in the scheduling consideration. If multiple data pumps are used, then separate delay periods can be established for each one. The next step is to synchronize two timers (clocks) running at the application server and the data pump, respectively, such as by sending a synchronization signal to reset the clock (this timer synchronization can also be repeated periodically).

After the application server and data pump have been synchronized and the delay period is known, data transmissions may be synchronized by adding the delay value to a scheduled transmission time for each file or stream request. The value may be added in by the application server or control server when scheduling the transmission, or stored locally in the data pump and added by the data pump to the base transmission time indicated by the scheduler. The data pump then stages the requested data for delivery at the revised time.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of delivering data in a deterministic manner across a communications environment, comprising the steps of:

calibrating a process of the environment between a data pump and a controller to determine a maximum transmission delay value;

scheduling a base transmission time for delivery of an asset in response to a request received at the controller;

calculating a revised transmission time using the base transmission time and the maximum transmission delay value; and transmitting the asset from the data pump at the revised transmission time.

2. The method of claim 1 wherein:

the communications environment is a network environment across one or more connected systems; and said transmitting step transmits the asset in a digital format.

3. The method of claim 1 wherein:

the communications environment is a broadcast environment; and said transmitting step transmits the asset in an analog format.

4. The method of claim 1 wherein said calibrating step includes the step of synchronizing respective timers in the controller and the data pump.

5. The method of claim 1 wherein:

the controller has an application server for receiving the request, and a control server for processing commands from the application server and providing corresponding control functions to the data pump;

the data pump transmits data to a rendering device; and said calibrating step measures the maximum transmission delay value from the time a command is received by the application server to the time that the data pump begins transmission.

6. The method of claim 1 wherein said calculating step adds the maximum transmission delay value to the base transmission time to obtain the revised transmission time.

7. The method of claim 1 further comprising the step of formulating the request using a content management database.

8. A data delivery system comprising:

a controller;

a data pump connected to said controller;

a user workstation connected to said controller and said data pump over a network; and means for (i) scheduling a base transmission time for delivery of an asset in response to a request from said user workstation received at said controller, (ii) calculating a revised transmission time using said base transmission time and a transmission delay value, and (iii) transmitting said asset from said data pump at said revised transmission time.

9. The data delivery system of claim 8 further comprising means for calibrating a process between said controller and said pump to determine said transmission delay value.

10. The data delivery system of claim 8 further comprising a digital output port connected to said data pump.

11. The data delivery system of claim 8 further comprising an analog output port connected to said data pump.

12. The data delivery system of claim 8 wherein said controller includes:

an application server for receiving said request; and a control server for processing commands from the application server and providing corresponding control functions to said data pump.

13. The data delivery system of claim 8 further comprising means for managing assets of said data pump based on their contents, and responsive to said controller.

14. A computer program product comprising:

a storage medium adapted to be read by a computer; and program instructions stored on said storage medium for (i) calibrating a process of a communications environment between a data pump and a controller, to determine a transmission delay value, (ii) scheduling a base transmission time for delivery of an asset in response to a request received at the controller, (iii) calculating a revised transmission time using the base transmission time and the transmission delay value, and (iv) transmitting the asset from the data pump at the revised transmission time.

15. The computer program product of claim 14 wherein said program instructions further are for establishing the controller by connecting an application server to a control server, wherein the application server receives the request and the control server processes commands from the application server and provides corresponding control functions to the data pump.

16. The computer program product of claim 15 wherein said program instructions further are for managing a database having content information regarding assets of the data pump.

* * * * *